United States Patent
Kasahara et al.

(10) Patent No.: US 8,206,588 B2
(45) Date of Patent: Jun. 26, 2012

(54) CONDENSATE FILTERING DEVICE

(75) Inventors: Satoshi Kasahara, Koshigaya (JP);
Mitsuru Yoden, Tokyo (JP)

(73) Assignee: Organo Corporation, Tokyo (JP)

( * ) Notice: Subject to any disclaimer, the term of this patent is extended or adjusted under 35 U.S.C. 154(b) by 1120 days.

(21) Appl. No.: 12/061,348

(22) Filed: Apr. 2, 2008

(65) Prior Publication Data
US 2008/0245712 A1 Oct. 9, 2008

(30) Foreign Application Priority Data

Apr. 5, 2007 (JP) ................. 2007-099638

(51) Int. Cl.
*B01D 63/04* (2006.01)
*B01D 65/02* (2006.01)
*B01D 65/10* (2006.01)

(52) U.S. Cl. ............ 210/340; 210/85; 210/321.69; 210/500.23

(58) Field of Classification Search ............ 210/340, 210/85, 321.69, 321.89, 323.2, 92, 321.7, 210/321.79, 321.8, 409, 411, 94, 95, 332, 210/636, 500.23; 73/863.23, 863.24, 863.25
See application file for complete search history.

(56) References Cited

U.S. PATENT DOCUMENTS 5,209,852 A * 5/1993 Sunaoka et al. ............ 210/636
6,156,200 A * 12/2000 Zha et al. ................. 210/321.89
2003/0136738 A1 * 7/2003 Kim et al. ................. 210/636
2009/0001018 A1 * 1/2009 Zha et al. .................. 210/636

FOREIGN PATENT DOCUMENTS

JP 2003-340245 A 12/2003

OTHER PUBLICATIONS

Complete Machine translation (English) JP 2003-340245-A; Dec. 2, 2003.*

* cited by examiner

*Primary Examiner* — Nam Nguyen
*Assistant Examiner* — Paul J Durand
(74) *Attorney, Agent, or Firm* — Leason Ellis LLP.

(57) ABSTRACT

A condensate filtering device of the present invention comprises a simulation unit which is able to simulate operating conditions being the same as operating conditions of a main body of an actual condensate filtering device and sample a hollow fiber membrane easily. The condensate filtering device comprises a unit evaluating properties of a hollow fiber membrane provided with a main body of the condensate filtering device containing a first hollow fiber membrane module in which filtration of condensate and air scrubbing washing are repeated, and equipped with a column containing a second hollow fiber membrane module having a hollow fiber membrane which is the same kind as the hollow fiber membrane of the first hollow fiber membrane module; and a line introducing the condensate for unit which is a branched line from a line introducing the condensate directing to the main body of the condensate filtering device and introduces the condensate into the unit evaluating the properties of the hollow fiber membrane.

12 Claims, 3 Drawing Sheets

CONDENSATE FILTERING DEVICE

BACKGROUND OF THE INVENTION

1. Field of the Invention

The present invention relates to a condensate filtering device, especially, a hollow fiber membrane type condensate filtering device to be provided in thermal power plants or nuclear power plants.

Priority is claimed on Japanese Patent Application No. 2007-099638, filed on Apr. 5, 2007, the content of which is incorporated herein by reference.

2. Description of Related Art

A hollow fiber membrane module used in a hollow fiber membrane type condensate filtering device usually has approximately a 5 to 10 year lifetime. In order to determine whether the hollow fiber membrane module can be further used, it is necessary that a part of the hollow fiber membrane is sampled to be a sample and the sample is examined about its properties such as tensile elongation or the like. For examining the properties, conventionally, the following operations are necessary.

(1) A module which is practically being used is taken out of a column by detaching the upper end plate of a condensate filtering device.

(2) A part of a protective outer cylinder of the module is cut to make a window for sampling a hollow fiber membrane, and the window is closed after sampling the hollow fiber membrane.

(3) The upper end plate is attached to the condensate filtering device. All gaskets are changed to new ones.

(4) A pressure/leak test of the condensate filtering device is carried out.

In such a conventional method, in order to open the condensate filtering device, the device is required to be separated from a system during sampling. However, since the condensate filtering device performs important roles of removing suspension materials in a condensate and protecting important devices provided in subsequent stages, sampling cannot be carried out while a power plant is in use and has been substantially carried out while the power plant is being stopped. In order to sample the hollow fiber membrane, a few days and a lot of money are required, and further it is necessary to consider radiation protection of an operator when the condensate filtering device is provided in the radiation controlled area.

In order to know membrane deterioration or the like in a membrane filtering device, a technique such that membrane deterioration or the like of a main body of the membrane filtering device can be simulated by providing a mini-membrane module to the main body of the membrane filtering device in parallel and flowing water to be treated into the mini-membrane module is known (Japanese Unexamined Patent Application No. 2003-340245).

However, the technique disclosed in Japanese Unexamined Patent Application No. 2003-340245 does not direct to a simulation for a condensate filtering device, but directs to a simulation of a clogging state of the membrane of the main body of the membrane filtering device or a simulation for determining the appropriateness of the chemical washing. In the hollow fiber membrane type condensate filtering device to be provided in thermal power plants or nuclear power plants, as described above, the hollow fiber membrane module usually has a 5 to 10 year lifetime, and condensate filtration, air scrubbing washing, discharge of waste water after washing, and an operation for filling the module with water after the washing are repeated for a long period of time. However, Japanese Unexamined Patent Application No. 2003-340245 does not disclose simulations of the above operation modes. When such simulations are applied to the condensate filtering device, it is considered that, especially, simulations of air scrubbing washing and operations accompanied therewith are important. However, such a simulator has not been known.

BRIEF SUMMARY OF THE INVENTION

An object of the present invention is a provision of a condensate filtering device having a simulation unit which is able to simulate operating conditions being the same as operating conditions of a main body of an actual condensate filtering device and sample a hollow fiber membrane easily, in view of problems in a conventional sampling operation of the hollow fiber membrane, and in view of a conventional mini-membrane module which does not direct to the condensate filtering device.

To solve the above problems, the first aspect of the present invention is a condensate filtering device comprising a unit evaluating properties of a hollow fiber membrane provided with a main body of the condensate filtering device containing a first hollow fiber membrane module in which filtration of condensate and air scrubbing washing are repeated, and equipped with a column containing a second hollow fiber membrane module having a hollow fiber membrane which is the same kind as the hollow fiber membrane of the first hollow fiber membrane module; and a line introducing the condensate for unit which is a branched line from a line introducing the condensate directing to the main body of the condensate filtering device and introduces the condensate into the unit evaluating the properties of the hollow fiber membrane.

The above condensate filtering device may further comprise a line introducing air for scrubbing for the unit which introduces air for scrubbing into the unit evaluating the properties of the hollow fiber membrane.

In the above condensate filtering device, the amount of condensate to be introduced into the unit evaluating the properties of the hollow fiber membrane corresponds to a ratio of membrane area of the hollow fiber membrane of the first hollow fiber membrane module and the hollow fiber membrane of the second hollow fiber membrane module.

In the above condensate filtering device, the amount of air for scrubbing to be introduced into the unit evaluating the properties of the hollow fiber membrane is an amount in which an amount of air supplied for scrubbing per unit cross-sectional area in an assembled portion of the hollow fiber membrane of the first hollow fiber membrane module are substantially equal to an amount of air supplied for scrubbing per unit cross-sectional area in an assembled portion of the hollow fiber membrane of the second hollow fiber membrane module.

According to the above aspect, since operating conditions being the same as the operation conditions in the main body of the condensate filtering device are accurately simulated in the unit evaluating the properties of the hollow fiber membrane, the condition of the hollow fiber membrane in the condensate filtering device is accurately evaluated when a part of the hollow fiber membrane is sampled from the unit evaluating the properties of the hollow fiber membrane. Since the unit evaluating the properties of the hollow fiber membrane may be a small device and the hollow fiber membrane in the unit is very easily sampled, facilitation of the sampling operation, shortening of time, and cost reduction are reliably achieved.

The above condensate filtering device may have a protective cylinder with pores which is detachably provided around the second hollow fiber module.

By providing the protective cylinder, the air for scrubbing is easily fed to the second hollow fiber module in the condition being the same as the condition of the main body of the condensate filtering device, therefore, air scrubbing washing is more accurately simulated in the same level of the main body of the condensate filtering device.

The protective cylinder may be provided between the second hollow fiber membrane module and the column, or may be provided at the outer of the column. Since the protective cylinder needs to detach during sampling, with taking facilitation of attaching and detaching the protective cylinder into consideration, the place that the protective cylinder should be provided is decided.

At least a part, preferably all of the air for scrubbing may be introduced into the protective cylinder. According to this, the air scrubbing washing being equal to that of the main body of the condensate filtering device is more accurately simulated.

The volume of the above protective cylinder may be 50% or less of the volume of the above column. This volume ratio enables the column to hold relatively the large volume of water to the small volume of the air for scrubbing, therefore, pushing water which is held in the column out of the system by the air for scrubbing is prevented.

The unit evaluating properties of hollow fiber membrane may be further connected with at least one of a line discharging waste water after washing, a line exhausting air for scrubbing, and a line discharging water which fills the column after washing, in addition to the above each introduction line. The line exhausting air for scrubbing and the line discharging water which fills the column after washing may be substituted with a shared line.

The above condensate filtering device may further comprise, as an adjusting device of introduction amount to the unit evaluating the properties of the hollow fiber membrane, at least one of a condensate flow rate adjusting device adjusting the flow rate of condensate so as to correspond to a ratio of a membrane area of a hollow fiber membrane of the first hollow fiber membrane module and hollow fiber membrane of the second hollow fiber membrane module; and an air for scrubbing flow rate adjusting device adjusting an amount of air supplied for scrubbing so that the amount of air supplied for scrubbing per unit cross-sectional area in an assembled portion of hollow fiber membranes of the first hollow fiber membrane module are substantially equal to the amount of air supplied for scrubbing per unit cross-sectional area in an assembled portion of hollow fiber membranes of the second hollow fiber membrane module. Since the flow rate of the condensate is adjusted so as to correspond to the ratio of membrane area of a hollow fiber membrane by the condensate flow rate adjusting device, and the amount of air supplied for scrubbing per unit cross-sectional area is adjusted, operating conditions being the same as the operation conditions in the main body of the condensate filtering device are more accurately simulated.

In the second hollow fiber membrane module, a site attached with a hollow fiber membrane to be sampled for evaluating properties may be closably provided. According this constitution, the rest hollow fiber membrane after sampling maintain the operating conditions the same as the operation conditions in the main body of the condensate filtering device in the simulation. It is necessary to readjust the ratio of a membrane area of a hollow fiber membrane, and a ratio of the amount of air supplied for scrubbing per unit cross-sectional area of the first hollow fiber membrane module and that of the second hollow fiber membrane module in correspondence with the hollow fiber membrane to be sampled for evaluating properties.

The second aspect of the present invention is a unit evaluating properties of a hollow fiber membrane provided with a main body of the condensate filtering device containing a first hollow fiber membrane module in which filtration of the condensate and air scrubbing washing are repeated, comprising a column containing a second hollow fiber membrane module which is the same kind as a hollow fiber membrane of the first hollow fiber membrane module.

According to the condensate filtering device of the present invention, since the operation conditions being the same as the operation condition in the main body of the condensate filtering device are accurately simulated in the unit evaluating the properties of the hollow fiber membrane, a followup state of the hollow fiber membrane in the main body of the condensate filtering device can be accurately known by sampling the hollow fiber membrane from the unit evaluating the properties of the hollow fiber membrane. Since the hollow fiber membrane is sampled from a small size unit evaluating the properties of the hollow fiber membrane, the sampling operation can be easily carried out within a short time and at a low cost.

The present invention is able to be applied to every hollow fiber membrane type condensate filtering device that is provided in thermal power plants and nuclear power plants.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use one particular implementation of the invention, is not intended to limit the enumerated claims, but to serve as particular examples thereof.

Figure 1:
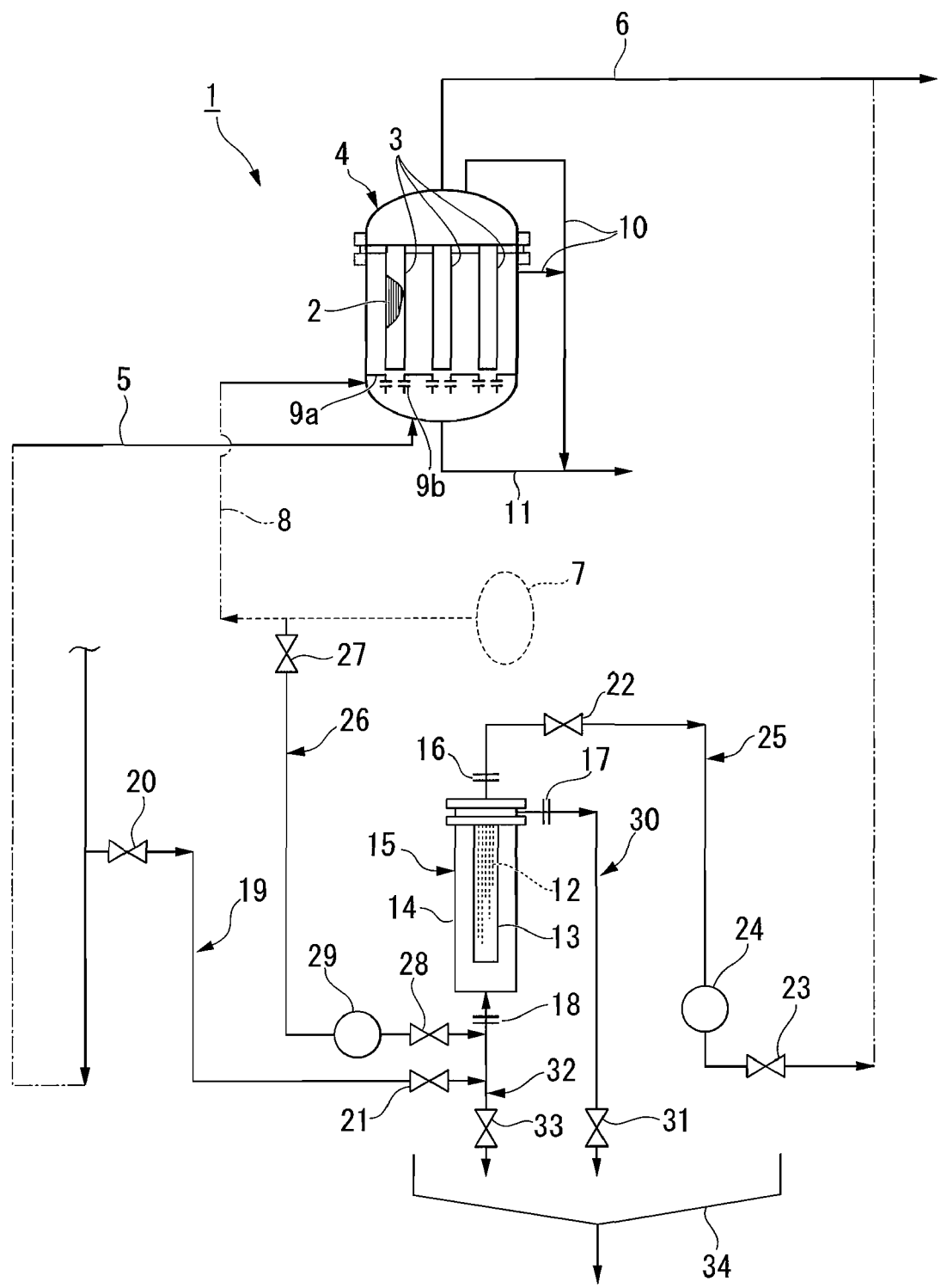
FIG. 1 is a schematic diagram showing a condensate filtering device according to the first embodiment of the present invention.

FIG. 1 is a diagram showing a condensate filtering device according to an embodiment of the present invention. The condensate filtering device 1 shown in FIG. 1 includes a main body 4 of the condensate filtering device in which a plurality of hollow fiber membrane modules 3 (modules with an outer casing are shown in the figure), each of which has a plurality of hollow fiber membrane 2, is accommodated. In a normal condensate filtering process, the condensate is introduced into the main body 4 of the condensate filtering device through a line introducing the condensate 5, and after being filtered through the hollow fiber membrane 2, it is discharged via a line discharging line 6 to be circulated through the condensate system. During a washing process, an air scrubbing washing for separating and removing filter cake on the surface of the hollow fiber membrane 2 is carried out. Air for scrubbing is introduced into the main body 4 of the condensate filtering device from an air source 7 via a line introducing air for scrubbing 8. In the embodiment shown in the figure, the air for scrubbing is supplied to the surroundings of the hollow fiber membrane modules 3 and the outer cylinder thereof via an air distributor 9a and air introduction pores 9b. Then, the air for scrubbing is discharged via a line exhausting air for scrubbing 10. In the embodiment shown in the figure, the line exhausting air for scrubbing 10 also functions as a line discharging water which fills the main body 4 of the condensate filtering device after washing. Waste water after washing is discharged via a line discharging waste water after washing 11. The above-mentioned condensate filtration, air scrubbing washing, discharge of waste water after washing, and operation for filling with water after washing are repeated for the main body 4 of the condensate filtering device for a long period of time.

For the above main body 4 of the condensate filtering device, there is provided a unit 15 evaluating properties of a hollow fiber membrane which includes a column 14 in which a module 13 having a plurality (for example, one hundred) of hollow fiber membranes 12 which are the same kind as the hollow fiber membranes 2 is accommodated. A detachable protective cylinder having pores is provided around the hollow fiber membrane module 13, and this will be described in detail later. The unit 15 evaluating the properties of the hollow fiber membrane is connected to the condensate system via flanges 16, 17, and 18, and the unit 15 evaluating the properties of the hollow fiber membrane may be separated at these flange portions, if necessary.

A line introducing the condensate for the unit 19 through which the condensate is introduced into the unit 15 evaluating the properties of the hollow fiber membrane is a branched line from the line introducing the condensate 5 directing to the main body 4 of the condensate filtering device, and introduces condensate into the unit 15 evaluating the properties of the hollow fiber membrane by the operation of valves 20 and 21. The introduced condensate, after being filtered by the hollow fiber membranes 12 of the hollow fiber membrane module 13, is discharged via a line discharging the condensate for the unit 25 which is provided with a flow rate control valve 24 as a flow rate adjusting means, and then the condensate is either returned to the condensate cycling system by being merged with the line discharging the condensate 6, or discharged to a discharging system. The amount of the condensate introduced into the unit 15 evaluating the properties of the hollow fiber membrane is adjusted to be an amount corresponding to the ratio of the membrane area of the hollow fiber membrane 2 in the main body 4 of the condensate filtering device and the hollow fiber membrane 12 in the unit 15 evaluating the properties of the hollow fiber membrane. This adjustment is carried out by using the flow rate control valve 24. The flow rate control valve 24 as the flow rate adjusting means may be disposed at the line introducing the condensate for the unit 19 side.

A line introducing air scrubbing for the unit 26, which is a branched line from the line introducing air for scrubbing 8 directing to the main body 4 of the condensate filtering device and introduces air scrubbing into the unit 15 evaluating the properties of the hollow fiber membrane, is also connected to the unit 15 evaluating the properties of the hollow fiber membrane. The introduction of air is controlled by valves 27 and 28, and the amount of air for scrubbing to be introduced is adjusted by a flow rate control valve 29 which functions as the flow rate adjusting means so that the amount of air supplied for scrubbing per unit cross-sectional area in an assembled portion of the hollow fiber membrane of the hollow fiber membrane module 3 in the main body 4 of the condensate filtering device are substantially equal to the amount of air supplied for scrubbing per unit cross-sectional area in an assembled portion of the hollow fiber membrane module 13 of the unit 15 evaluating the properties of the hollow fiber membrane. The introduced air for scrubbing, after carrying out a scrubbing operation in the unit 15 evaluating the properties of the hollow fiber membrane, is discharged via a line exhausting air for scrubbing for the unit 30 by the operation of a valve 31. The line exhausting air for scrubbing for the unit 30 also functions as a line discharging water which fills the column after washing with water. Although the flow state of the air for scrubbing may be changed for the hollow fiber membrane module 3 in the main body 4 of the condensate filtering device depending on the ratio of cross-sectional area of the outer cylinder of the module 3 with the assembled part of only the hollow fiber membrane 2, or for the hollow fiber membrane module 13 in the unit 15 evaluating the properties of the hollow fiber membrane depending on the ratio of cross-sectional area of the column 14 or the protective cylinder described later with the assembled part of only the hollow fiber membrane 12, it becomes possible to accurately simulate the conditions for washing air for scrubbing in the main body 4 of the condensate filtering device in the unit 15 evaluating the properties of the hollow fiber membrane by adjusting the introduction amount of air for scrubbing for the entire unit 15 evaluating the properties of the hollow fiber membrane so that the amount of air supplied for scrubbing becomes equal for per unit cross-sectional area of the assembled part of the hollow fiber membrane in each hollow fiber membrane module.

Also, a line discharging waste water after washing 32 is connected to the unit 15 evaluating the properties of the hollow fiber membrane, and waste water after washing in the column 14 is discharged to a sink 34 by the operation of a valve 33.

Figure 2:
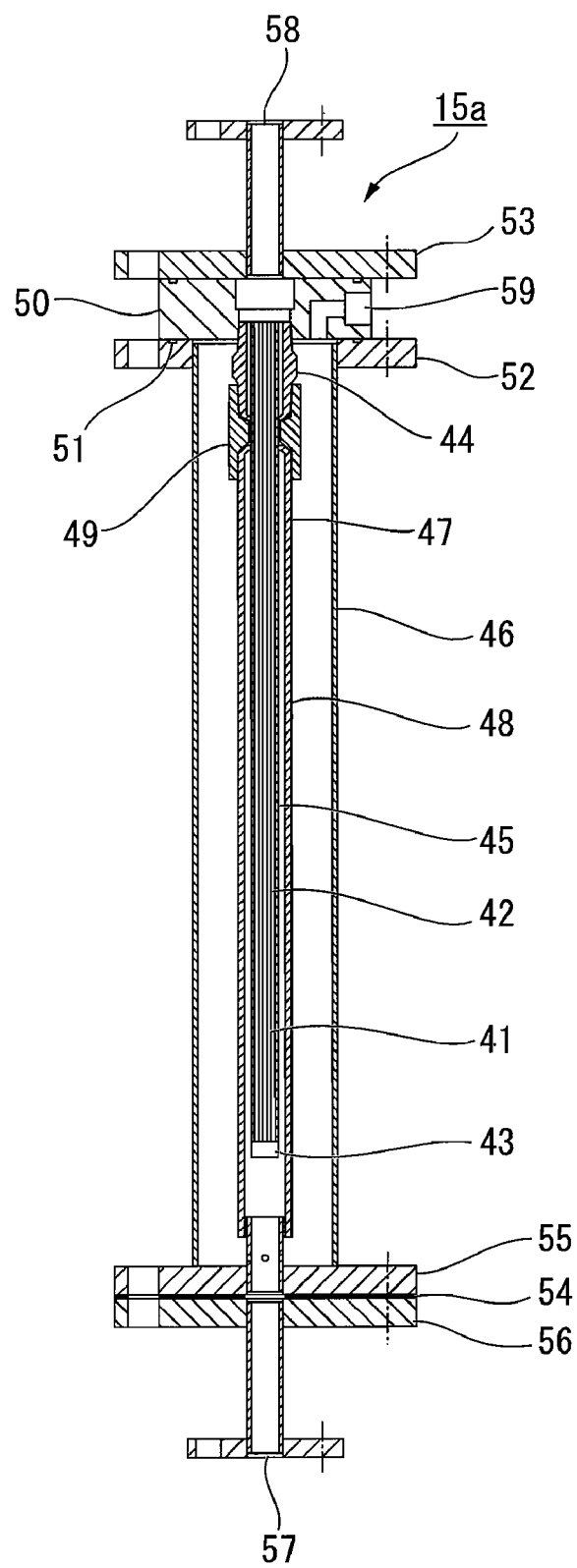
FIG. 2 is a longitudinal section showing an embodiment of a unit evaluating properties of a hollow fiber membrane of FIG. 1.
Figure 3:
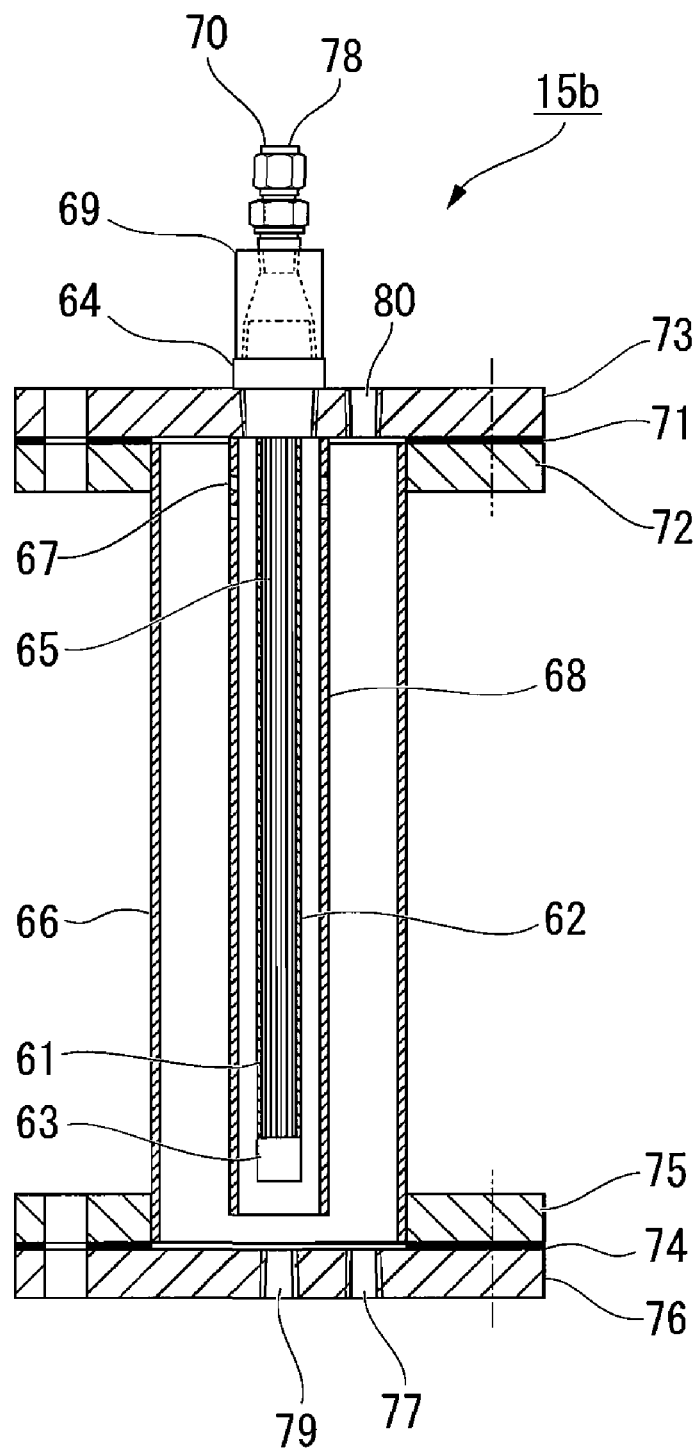
FIG. 3 is a longitudinal section showing another embodiment of a unit evaluating properties of a hollow fiber membrane of FIG. 1.

The unit 15 evaluating the properties of the hollow fiber membrane may be constructed as shown in FIGS. 2 and 3. The unit 15a evaluating the properties of the hollow fiber membrane shown in FIG. 2 includes a hollow fiber membrane module 45 constituted of a shaft 41, the bundle of a hollow fiber membrane 42 disposed around the shaft 41, a member 43 fixing the lower end of the bundle of the hollow fiber membrane 42, and a member 44 fixing the upper end of the hollow fiber membrane 42. The hollow fiber membrane module 45 is connected to a column 46 via the member 44. A protective cylinder 48 having small pores 47 at upper portion thereof is disposed around the hollow fiber membrane module 45, and the protective cylinder 48 is detachably connected and fixed to the member 44 via a member 49 and the hollow fiber membrane module 45 via the member 44. A support plate 50 disposed at the upper portion of the unit 15 evaluating the properties of the hollow fiber membranea is detachably fixed between flanges 52 and 53 via an O-ring 51. On the other hand, the lower portion of the unit 15 evaluating the properties of the hollow fiber membranea is fixed between flanges 55 and 56 via a gasket 54 so that it may be separated between the flanges 55 and 56.

When the condensate is introduced, it enters into the column 46 through a port 57, is filtered by the outside surface of the hollow fiber membrane 42, and is discharged through a port 58. Air for scrubbing is introduced into the protective cylinder 48 located inside the column 46 via the port 57, and after washing the surface of the hollow fiber membrane 42, it is discharged outside the protective cylinder 48 through the small pores 47 at upper portion thereof, and outside the column 46 via a port 59. The waste water after washing is discharged outside the column 46 via the port 57. Also, water for filling after washing is introduced via the port 57. Introduction and discharge of air during the series of operation is carried out via the port 59.

The unit 15b evaluating the properties of the hollow fiber membrane shown in FIG. 3 includes a hollow fiber membrane module 65 constituted of a shaft 61, the bundle of a hollow fiber membrane 62 disposed around the shaft 61, a member 63 fixing the lower end of the bundle of the hollow fiber membrane 62, and a member 64 fixing the upper end of the hollow fiber membrane 62. The hollow fiber membrane module 65 is connected to a column 66 via the member 64. A protective cylinder 68 having small pores 67 at upper portion thereof is disposed around the hollow fiber membrane module 65, and is connected to the column 66 side. The upper portion of the unit 15b evaluating the properties of the hollow fiber membrane is constructed so as to be connectable to an external piping via a socket 69 and a connecter 70, and detachably fixed between flanges 72 and 73 via a gasket 71. On the other hand, the lower portion of the unit 15b evaluating the properties of the hollow fiber membrane is fixed between flanges 75 and 76 via a gasket 74 so that it may be separated between the flanges 75 and 76.

When condensate is introduced, it enters into the column 66 through a port 77, is filtered by the outside surface of the hollow fiber membrane 62, and is discharged through a port 78. Air for scrubbing is introduced into the protective cylinder 68 located inside the column 66 via the port 77, and after washing the surface of the hollow fiber membrane 62, it is discharged outside the protective cylinder 48 through the small pores 67 at upper portion thereof, and outside the column 66 via a port 79. The waste water after washing is discharged outside the column 66 via the port 77. Also, water for filling after washing is introduced via the port 77. Introduction and discharge of air during the series of operation is carried out via the port 79. The port 77 may be used for the port 79.

In the condensate filtering device having the above constitutions, as shown in FIG. 1, condensate having the amount corresponding to a ratio of membrane area of the hollow fiber membrane 2 in the main body 4 of the condensate filtering device and the hollow fiber membrane 12 in the unit 15 evaluating the properties of the hollow fiber membrane flows into the unit 15 evaluating the properties of the hollow fiber membrane, and the air for scrubbing having the amount in which the amount of air supplied for scrubbing per unit cross-sectional area in an assembled portion of the hollow fiber membrane of the hollow fiber membrane module 3 in the main body 4 of the condensate filtering device is substantially equal to the amount of air supplied for scrubbing per unit cross-sectional area in an assembled portion of the hollow fiber membrane of the hollow fiber membrane module 13 in the unit 15 evaluating the properties of the hollow fiber membrane flows into the unit 15 evaluating the properties of the hollow fiber membrane. Since operating conditions being the same as the operation conditions in the main body 4 of the condensate filtering device are accurately simulated in the unit 15 evaluating the properties of the hollow fiber membrane, the followup state of the hollow fiber membrane 2 in the main body 4 of the condensate filtering device is accurately known by sampling the hollow fiber membrane from the unit 15 evaluating the properties of the hollow fiber membrane. Since the hollow fiber membrane is sampled from a small size unit 15 evaluating the properties of the hollow fiber membrane, the sampling operation can be easily carried out with a short time and a low cost.

Especially, as shown in FIGS. 2 and 3, providing the protective cylinders 48 and 68 in the units 15a and 15b for evaluating properties of a hollow fiber membrane enables to simulate more accurately. Important points when the unit evaluating the properties of the hollow fiber membrane simulates the main body 4 of the condensate filtering device are the condition of introducing of condensate and the condition of contacting air for washing for the hollow fiber membrane. The former can be simulated by only adjusting the flow rate, however, the latter is difficult to simulate if the protective cylinder is not provided. In order to simulate the condition of contacting air for washing, the flow rate of air per cross-sectional area of an outer cylinder containing a hollow fiber membrane needs to determine in accordance with the flow rate in the main body 4 of the condensate filtering device. However, if the protective cylinder is not provided, the outer cylinder containing the hollow fiber membrane 2 in the hollow fiber membrane module 3 of the main body 4 of the condensate filtering device corresponds to a main body of the column in the unit evaluating the properties of the hollow fiber membrane, and therefore, air flow rate is set in accordance with the cross-sectional area of the column. In order to accurately contact the air for scrubbing to the hollow fiber membrane in the unit, the diameter of the column is preferably as small as possible. However, if the size of the column is too small, a relatively small amount of water held in the column having a small diameter is pushed by air for washing outside the system according as air is flown into the column, and then the scrubbing operation in the column becomes largely different from the scrubbing operation in the condensate filtering device 3. On the other hand, if the size of the column is too large, it becomes difficult to contact the air for scrubbing to the hollow fiber membrane in the unit in the same condition as the main body 4 of the condensate filtering device.

If the protective cylinder is provided, since the flow rate of air can be set in response to the cross-sectional area of the protective cylinder, the flow rate of air is decreased. Additionally, since a port for introducing air into the column is provided right under the protective cylinder, the air introduced can accurately contact the hollow fiber membrane. Since a relatively large volume of water is held in the column in comparison with the small flow rate of air, the water cannot be pushed by the air outside the system. The ratio of the volume of the protective cylinder to the total volume of the column is preferably 50% or less. By providing the protective cylinder, more precise simulation of the air scrubbing washing condition which is the same as that in the main body of the condensate filtering device can be carried out in the hollow fiber membrane module and the hollow fiber membrane in the unit evaluating the properties of the hollow fiber membrane.

As a method for sampling the hollow fiber membrane in the units 15a and 15b evaluating properties of hollow fiber membrane, when the unit 15a shown in FIG. 2 is used, the upper flange 53 is removed, the support plate 50 is taken out from the column 46 in a state that the hollow fiber membrane module 45 is still connected. After that the hollow fiber membrane module 45 is taken out, and then the protective cylinder 48 is removed to expose the hollow fiber membrane 42. A number of hollow fiber membrane necessary for sampling (for example, five in one hundred) is cut from the bundle of the hollow fiber membrane 42, and then it is attached to the column by a reversed process. At that time, the portion where the hollow fiber membrane 42, which was taken out for the sampling for evaluating properties, was attached may be closed, for example, by piercing a needle, and introduction of condensate, air scrubbing, etc., may be carried out using the same conditions for the main body 4 of the condensate filtering device until the next sampling. Note that the surface area of the hollow fiber membrane 42 taken out for sampling and the corresponding cross-sectional area thereof needs to be considered for readjustment.

For the case where the unit 15 shown in FIG. 3 is used, the upper socket 69 is taken out from the member 64 which includes the upper nipple joint of the hollow fiber membrane module. The bundle of hollow fiber membrane 62 is exposed by extracting the hollow fiber membrane module 65 from the column 66. The hollow fiber membranes necessary for sampling are cut from the bundle of the hollow fiber membrane 62, and then attached to the column by a reversed process. Note that the surface area of the hollow fiber membrane 62 taken out for sampling and the corresponding cross-sectional area thereof needs to be considered for readjustment.

Since the hollow fiber membranes taken out for sampling have been used under the same conditions for the main body 4 of the condensate filtering device, the state of the hollow fiber membranes in the main body 4 of the condensate filtering device may be accurately comprehended by evaluating the physical properties thereof. The evaluation of the physical properties may be carried out by, for example, tensile test. The tensile test may be performed based on JIS-L-1013, which corresponds to ISO 2062.

After carrying out the test by using the unit evaluating the properties of the hollow fiber membrane according to the present invention, the following excellent results were obtained as compared to a conventional method in which no unit evaluating the properties of the hollow fiber membrane is used.

Operation Time
Conventional method: 3 days (8 hours×3 days=24 hours)
Present invention: 3 hours That is, the operation time is reduced to 1/8 of that of the conventional method. As for the cost required for the operation, it is also considered to be reduced to 1/8 of that of the conventional method since most of the cost necessary for checking the physical properties is spent for labor of the operation. Moreover, the amount of radiation exposed is also reduced to 1/8 since it is reduced relative to the operation time within the radiation controlled area. Accordingly, it becomes easy to take countermeasures for radiation exposure.

What is claimed is:

1. A condensate filtering device comprising:
    a main body of the condensate filtering device containing a first hollow fiber membrane module in which filtration of condensate and air scrubbing washing are repeated, the first hollow fiber membrane module containing hollow fiber membranes;
    a line for introducing the condensate directly to the main body;
    a line for introducing air for scrubbing into the main body;
    a unit for evaluating properties of the hollow fiber membranes in the first hollow fiber membrane module of said main body of the condensate filtering device, said unit being equipped with a column containing a second hollow fiber membrane module with the same kind of hollow fiber membranes as the module contained in the main body, said second hollow fiber membrane module configured such that a part of its hollow fiber membranes may be partially taken out for sampling to evaluate the properties;
    a line for introducing the condensate into the unit which is branched from the line introducing the condensate directly to the main body;
    a line for introducing air into the unit which is branched from the line introducing air into the main body; and
    a protective cylinder having pores and being detachably provided around the second hollow fiber membrane module inside the column.

2. A condensate filtering device according to claim 1, in which an amount of condensate to be introduced into the unit evaluating the properties of the hollow fiber membranes within the first hollow fiber membrane module is proportional to a ratio of a membrane area of the hollow fiber membranes of the second hollow fiber membrane module and a membrane area of the hollow fiber membranes of the first hollow fiber membrane module.

3. A condensate filtering device according to claim 1, in which an amount of air for scrubbing to be introduced into the unit evaluating the properties of the hollow fiber membranes within the first hollow fiber membrane module is an amount in which an amount of air supplied for scrubbing per unit cross-sectional area in an assembled portion of the hollow fiber membrane of the first hollow fiber membrane module is substantially equal to an amount of air supplied for scrubbing per unit cross-sectional area in an assembled portion of the hollow fiber membrane of the second hollow fiber membrane module.

4. A condensate filtering device according to claim 1, in which the protective cylinder is connected to a side of the second hollow fiber membrane module at one end thereof.

5. A condensate filtering device according to claim 1, in which the protective cylinder connected to a side of the column at one end thereof.

6. A condensate filtering device according to claim 1, in which at least a part of the air for scrubbing is introduced into the protective cylinder.

7. A condensate filtering device according to claim 1, in which a volume of the protective cylinder is 50% or less of a volume of the column.

8. A condensate filtering device according to claim 1, further comprising: a line discharging waste water after washing which is connected to the unit evaluating the properties of the hollow fiber membranes within the first hollow fiber membrane module.

9. A condensate filtering device according to claim 1, further comprising: a line exhausting air for scrubbing which is connected to the unit evaluating the properties of the hollow fiber membranes within the first hollow fiber membrane module.

10. A condensate filtering device according to claim 1, further comprising: a line discharging water which fills the column after washing which is connected to the unit evaluating the properties of the hollow fiber membranes within the first hollow fiber membrane module.

11. A condensate filtering device according to claim 1, further including an adjusting device for adjusting the introduction of an amount of material to the unit for evaluating the properties of the hollow fiber membranes, comprising at least one of:
    a condensate flow rate adjusting device for adjusting the flow rate of condensate to the unit so as to be proportional to a ratio of a membrane area of the hollow fiber membrane of the second hollow fiber membrane module and a membrane area of the hollow fiber membrane of the first hollow fiber membrane module; and
    a flow rate adjusting device for adjusting an amount of air supplied for scrubbing so that the amount of air supplied for scrubbing per unit cross-sectional area in an assembled portion of the hollow fiber membranes of the first hollow fiber membrane module is substantially equal to the amount of air supplied for scrubbing per unit cross-sectional area in an assembled portion of the hollow fiber membranes of the second hollow fiber membrane module.

12. A condensate filtering device according to claim 1, in which open ends of the hollow fiber membranes, which are generated by taking out the part of the hollow fiber membranes, may then be closed by inserting needles into the open end.

* * * * *